Oct. 3, 1933.     E. H. PECKINPAUGH     1,929,150

FISH LURE

Filed Nov. 5, 1929

INVENTOR
E. H. Peckinpaugh
BY
Siggers & Adams
ATTORNEYS

Patented Oct. 3, 1933

1,929,150

UNITED STATES PATENT OFFICE 1,929,150

FISH LURE

Ernest H. Peckinpaugh, Chattanooga, Tenn.

Application November 5, 1929. Serial No. 404,948

5 Claims. (Cl. 43—48)

This invention relates to artificial fish lures and among other objects, aims to provide an improved floating lure of the type commonly known as a floating fly rod lure and especially shaped to enable an angler by manipulating his rod make it simulate the movements of a struggling or jumping insect or small animal on the surface of the water to afford an irresistible attraction to game fish.

In the accompanying drawing showing an illustrative example of the invention:

Figure 1:
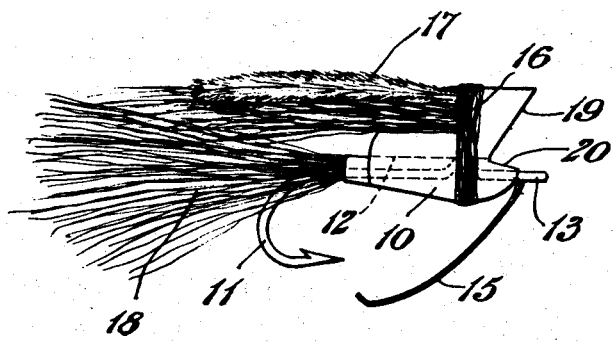
Fig. 1 is a side elevation of a lure simulating an insect embodying the improvements.
Figure 2:
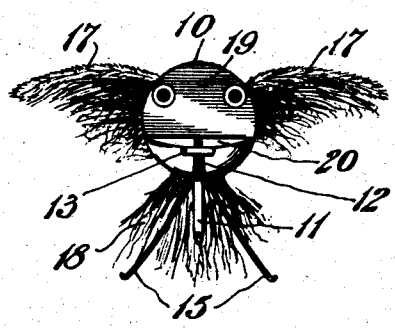
Fig. 2 is a front end elevation of the lure shown in Fig. 1.

Many of the ordinary floating fly rod lures now on the market merely simulate chosen edible or appetizing insects and small animals such as frogs, mice, etc., and they are used to attract game fish principally because of their attractive appearance. Experience has shown that the appearance alone is not sufficiently attractive to assure strikes by many of the gamest fish. However, game fish are attracted very quickly to lures which are made to move more or less erratically on the water, simulating the struggling or jumping activities of insects and the like. It is also well known that most of the game fish are found in the vicinity of snags, weeds and more or less rough places in the water, making it necessary or desirable to employ some sort of weed guard to prevent the hook from becoming entangled. It is the principal aim of this invention to provide an improved ornamental and attractive floating lure which simulates edible insects and has a specially shaped body designed to simulate the struggling or jumping movements and activities of live insects, when it is pulled through the water.

Referring particularly to the example illustrated in the drawing, there is shown a specially shaped body 10 conveniently composed of cork or some other buoyant material and applied to a hook 11 which is adapted to hang in a vertical plane as the body is drawn along the surface of the water. Herein, the body 10 is provided with a longitudinal kerf 12 adapted to receive the shank of the hook and be secured thereto behind the eye 13. The shank of the hook in this instance has an outwardly bent hump or offset portion 14, the construction being such that the shank cannot be twisted with the body. The depth of the kerf is preferably about one third of the major diameter of the body so that the hook will maintain the body in upright position on the water.

Figure 3:
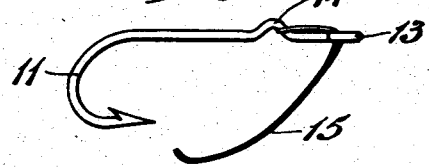
Fig. 3 is a side elevation of a hook and weed guard adapted to be employed in making the lure.
Figure 4:
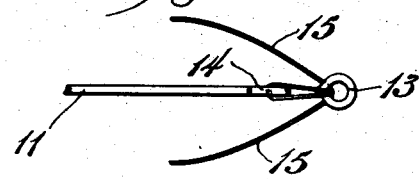
Fig. 4 is a top plan view of the hook and weed guard shown in Fig. 3.

In this example, a weed guard 15 is first assembled on the hook before it is inserted in the kerf of the body. As will be seen in Figs. 3 and 4, the weed guard is conveniently composed of a strand of spring wire which is bent in the middle, inserted in the bent or outwardly offset portion of the shank and threaded through the eye, the ends being bent downwardly and rearwardly below and in front of the bill of the hook. By this arrangement, the hump serves to prevent the weed guard from slipping either forwardly or backwardly on the shank.

After the hook with the attached weed guard is inserted in the kerf of the body 10, the body is secured to the shank by means of suitable wrappings of twine or thread 16. If desired, the twine or wrapping thread may also be utilized to secure tufts 17 of feathers or hair or a combination of feathers and hair, as shown, to the body, to simulate the wings of a bug or insect. Also, a tuft of tail feathers or hair 18 may be secured to the hook shank at the rear end of the body to simulate the tail of an insect.

As has been previously intimated, the body portion may be so shaped as to simulate a variety of insects, but in all cases, the forward portion thereof is much larger than the rear portion, the back curving sharply from the head toward the tail as clearly shown in Fig. 1. The front of the body is shown as being notched to present rearwardly converging faces 19 and 20 simulating the open mouth of an insect. However, the rearwardly inclined upper face 19 is much wider than the face or lip 20. In this connection, it might be mentioned that the body is adapted to be submerged to a depth of about one-third of its diameter and the wide upper face or lip is utilized to cause the forward end to ride over the surface of the water or bring it to the surface. The shape of the mouth is such as to give the body a great variety of wabbling or erratic motions, depending upon its manipulation along the surface of the water by the angler. For example, when the lure is pulled through the water, the upper face offers some resistance to forward movement and splashes the water, which it strikes, forwardly and downwardly against the surface of the water in front of the body. Also, the lower lip or face splashes the water across the spray made by the upper face and sets up a wall of sprayed water which offers great resistance. Thus, a sudden jerk will cause the body to make several movements simulating struggles and then it will very quickly stop. This jerking motion may be applied several times before the lure is pulled in and has to be cast out again, making it possible to get a strike without casting a number of times. As the body is drawn along or through the water, the weed guard 15 will prevent the bill of the hook from catching or becoming entangled in weeds, snags and the like.

The body may be coated with waterproof enamel and decorated in any manner that is desired. In this example, the eyes of the insect are painted on the inclined face 19 where they are clearly visible to the fish below. It is contemplated that the body portion may be so painted as to simulate articulated insects and that the open mouth may be painted any attractive color. Also, the tufts of hair or feathers or both may be colored to simulate different appetizing insects.

Obviously, the present invention is not restricted to the particular embodiment thereof herein shown and described.

What is claimed is:

1. A floating fish lure of the character described comprising a hook, a buoyant body rigidly connected to the hook shank and shaped to simulate the body of an insect; said hook shank being imbedded longitudinally in the lower part of the body; said body presenting an enlarged head having an upwardly curved bottom surface below the hook shank and rearwardly converging plane faces of different areas at the forward end above the hook shank simulating an open mouth and arranged to impart different erratic motions to the body when the lure is jerked or drawn on the water.

2. A fish lure of the character described comprising, in combination, a hook having an eye; an elongated buoyant body secured to the hook shank and shaped to simulate the body of an insect; said body presenting an enlarged head portion adjacent to the hook eye having rearwardly converging plane faces at the forward end simulating the open mouth of an insect and arranged above the hook shank; the upper inclined face being more nearly vertical than horizontal and the lower face being more nearly horizontal than vertical and arranged at such an angle as to impart to the body erratic motions where the lure is drawn along the surface of the water; and means secured to the body simulating the wings and tail of an insect.

3. A fish lure of the character described, comprising, in combination, a hook; a buoyant body simulating that of an insect secured to the hook shank; said body having a kerf extending longitudinally thereof to receive said shank and embed the same therein to a depth substantially equal to the depth of submergence of the body; said body having two rearwardly converging plane faces lying in planes at different angles to the horizontal and at the forward end above the hook shank simulating the open mouth of an insect, said faces being constructed and arranged to offer resistance to the forward movements of the body through the water and to impart to the body erratic movements as the body is drawn through the water.

4. A floating fish lure of the character described, comprising, in combination, a hook; a cork body shaped to simulate the body of an insect within which the shank of the hook is embedded and secured; a weed guard comprising a bent spring wire secured to the shank of the hook within said body and projecting through the hook eye; said body having plane surfaces at the forward end to impart erratic movements to the body when it is drawn through the water.

5. A fish lure of the character described comprising, in combination, a hook having a bent shank; a cork body embedding the shank and secured thereto with its forward end adjacent to the hook eye; artificial wings and a tail secured to the body; said body having converging angular faces at the forward end to simulate an open mouth and arranged to impart erratic motions to the body when it is drawn through the water; and a weed guard composed of spring wire secured to the shank within said body and projecting through the hook eye.

ERNEST H. PECKINPAUGH.